United States Patent [19]
Gilbert

[11] Patent Number: 6,026,858
[45] Date of Patent: Feb. 22, 2000

[54] POWER STEERING ASSEMBLY

[75] Inventor: Wendell L. Gilbert, Pleasant Shade, Tenn.

[73] Assignee: TRW Inc., Lyndhurst, Ohio

[21] Appl. No.: 08/988,327

[22] Filed: Dec. 10, 1997

[51] Int. Cl.[7] .................................................... F15B 9/10
[52] U.S. Cl. .................................. 137/625.21; 91/375 R
[58] Field of Search .......................... 91/375 A, 375 R; 137/625.21

[56] References Cited

U.S. PATENT DOCUMENTS

| | | |
|---|---|---|
| 4,232,586 | 11/1980 | Elser . |
| 4,555,186 | 11/1985 | Scruggs ........................................ 384/93 |
| 4,942,803 | 7/1990 | Rabe et al. . |
| 5,251,669 | 10/1993 | Bishop ................................ 91/375 A X |
| 5,571,238 | 11/1996 | Breitweg et al. ........................ 91/375 A |
| 5,575,193 | 11/1996 | Bareis et al. ............................ 91/375 A |
| 5,730,040 | 3/1998 | Strong ..................................... 91/375 A |
| 5,738,182 | 4/1998 | Birsching et al. .................. 91/375 A X |

FOREIGN PATENT DOCUMENTS

| | | | |
|---|---|---|---|
| 646338 | 12/1998 | Australia .............................. 91/375 A |

*Primary Examiner*—John Rivell
*Assistant Examiner*—Meredith H. Schoenfeld
*Attorney, Agent, or Firm*—Tarolli, Sundheim, Covell, Tummino & Szabo L.L.P.

[57] ABSTRACT

A power steering assembly (10) includes a rotatable valve core (40) which is encircled by a rotatable valve sleeve (41). The valve core (40) and valve sleeve (41) have surfaces which cooperate to direct a flow of power steering fluid during relative rotation between the valve core (40) and valve sleeve (41). A bearing assembly (100) is disposed between the valve core (40) and the valve sleeve (41) at a location adjacent to an axially outer end portion of the valve core (40). The bearing assembly (100) includes a plurality of rotatable bearing elements (124) which transmit sidewise loads between the valve core (40) and the valve sleeve (41). A bearing surface (102) is disposed on an axially inner end portion of the valve core (40). The bearing surface (102) is slidable along an inner surface area (104) on the valve sleeve (41) to transmit a sidewise load during relative rotation between the valve core (40) and the valve sleeve (41).

7 Claims, 3 Drawing Sheets

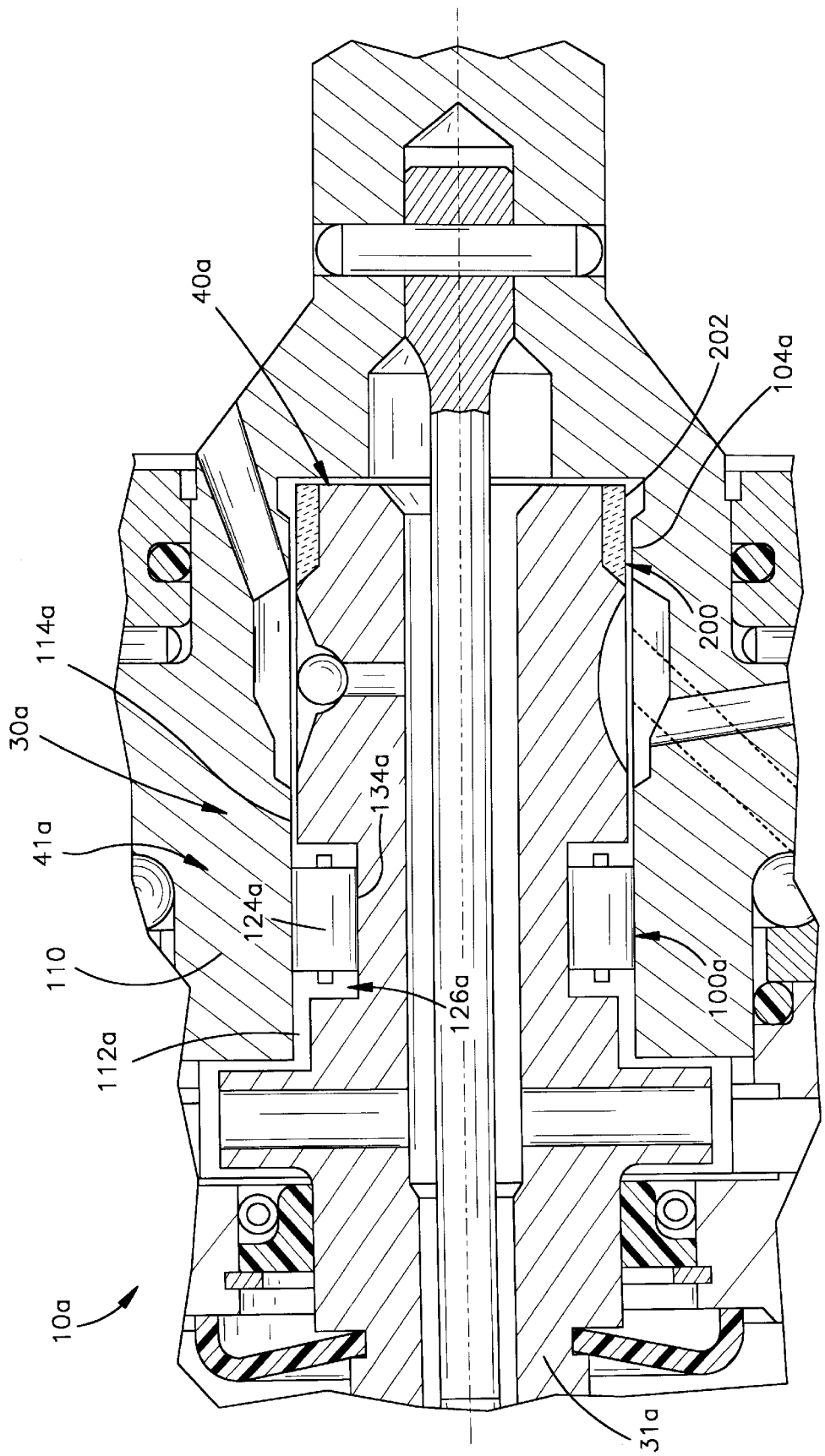

POWER STEERING ASSEMBLY

BACKGROUND OF THE INVENTION

The present invention relates to an improved control valve for use in a power steering assembly for turning steerable vehicle wheels.

A known power steering assembly is disclosed in U.S. Pat. No. 4,942,803 issued Jul. 24, 1990 and entitled "Steering Gear With Pressure-Balanced Valve". The power steering assembly disclosed in this patent includes a control valve having a valve sleeve which encircles a valve core. A force transmitting assembly connects the valve core with a steering wheel of a vehicle. Due to various factors, a sidewise load may be applied to the valve core. This sidewise load presses a cylindrical outer side surface on the valve core against a cylindrical inner side surface of the valve sleeve.

SUMMARY OF THE INVENTION

The present invention is a power steering assembly for use in turning steerable vehicle wheels. The power steering assembly comprises a valve core. A valve sleeve encircles the valve core. The valve core and the valve sleeve have surfaces which cooperate to direct a flow of power steering fluid during relative rotation between the valve core and the valve sleeve. A bearing assembly is disposed between the valve core and the valve sleeve at a location adjacent to a first end portion of the valve core. The bearing assembly includes a plurality of bearing elements which are rotatable relative to the valve core and which transmit sidewise loads between said valve core and the valve sleeve. Also, an end portion of the valve core, opposite to the first end portion of the valve core, has a bearing surface. The bearing surface is slidable along an inner surface area on the valve sleeve to transmit a sidewise load during relative rotation between the valve core and the valve sleeve. The bearing surface may be a surface on a separately formed body of low friction material, such as metallic glass, disposed on the valve core.

BRIEF DESCRIPTION OF THE DRAWINGS

The foregoing and other objects and features of the present invention will become more apparent upon a consideration of the following description taken in connection with the accompanying drawings wherein:

FIG. 3 is a fragmentary sectional view, generally similar to FIG. 2, illustrating a second embodiment of the control valve.

DESCRIPTION OF SPECIFIC PREFERRED EMBODIMENTS OF THE INVENTION

Figure 1:
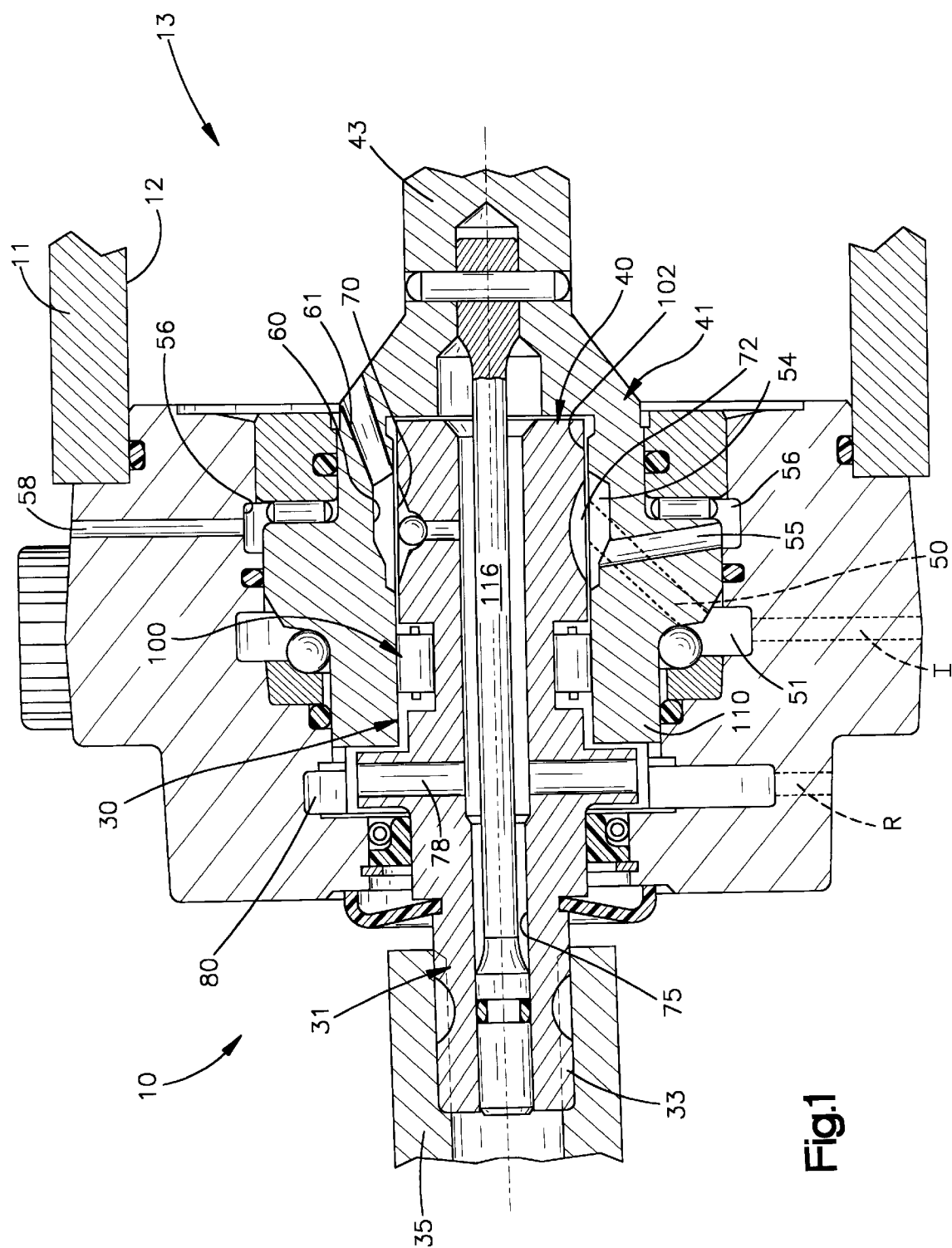
FIG. 1 is a sectional schematic view of a power steering assembly having a control valve constructed in accordance with the present invention.

The present invention is applicable to fluid operated servo mechanisms of a variety of constructions and uses. Preferably, the present invention is embodied in a power steering assembly 10 (FIG. 1) for turning the dirigible wheels of a vehicle to effect steering of the vehicle. The general construction of the power steering assembly 10 is known and includes a housing 11 having an inner cylindrical surface 12 defining a chamber 13. A piston (not shown) divides the chamber 13 into opposite chamber portions located at opposite sides of the piston.

A series of rack teeth (not shown) are formed on the periphery of the piston. The rack teeth mesh with teeth formed on a sector gear (not shown) in a known manner. The sector gear is fixed on an output shaft which extends outwardly from the power steering assembly 10 through an opening in the housing 11. The output shaft is typically connected to a pitman arm (not shown), which in turn is connected to the mechanical steering linkage of the vehicle. Thus, as the piston moves in the chamber 13, the output shaft is rotated to operate the steering linkage as will be understood by those skilled in the art.

The housing 11 includes a fluid inlet port I and a fluid return port R. The inlet port I and return port R are adapted to be connected in fluid communication with hydraulic circuitry including a power steering pump (not shown). Pressurized fluid is directed from the inlet port I to one or the other of the chamber portions on opposite sides of the piston by a directional control valve assembly 30. Fluid from the other of the chamber portions is simultaneously directed by the directional control valve assembly 30 to the return port R which is connected with the power steering pump fluid reservoir.

The valve assembly 30 includes a rotatable input shaft 31. The shaft 31 is supported for rotation relative to the housing 11. An outer end portion 33 of the shaft 31 is splined for fixed connection with a portion of a shaft 35. The shaft 35 is connected with a steering wheel which is manually turned by the operator of the vehicle to effect rotation of shaft 31.

The valve assembly 30 (FIG. 1) includes a cylindrical one-piece metal valve core 40 and a one-piece metal valve sleeve 41. The valve core 40 is integrally formed as one piece with the input shaft 31. The valve core 40 and input shaft 31 are formed of a homogenous material. The valve sleeve 41 is integrally formed as one piece with an externally threaded follow-up member 43. The valve sleeve 41 and follow-up member 43 are formed of a homogenous metal material. A torsion bar 116 is fixedly connected at one end to the input shaft 31 and is fixedly connected at its other end to the follow-up member 43. Thus, the torsion bar acts on the valve core 40 and valve sleeve 41 in a known manner.

The valve core 40 is located coaxially within the valve sleeve 41. The valve sleeve 41 encircles the valve core 40. The valve core 40 is supported for rotation relative to the valve sleeve 41 against the bias of the torsion bar 116. The valve core 40 and valve sleeve 41 cooperate to direct a flow of power steering fluid during turning of the input shaft 31.

The valve sleeve 41 (FIG. 3) has three radially directed passages 50, only one of which is shown in FIG. 1. The passages 50 extend from an outer circumference of the valve sleeve 41 to an inner circumference of the valve sleeve 41. The passages 50 are spaced 120° apart about the valve sleeve 41. The passages 50 communicate with an annulus 51 (FIG. 1) in the housing 11. The annulus 51 in turn is connected with the inlet port I and is thus subjected to the fluid pressure provided by the power steering pump.

The valve sleeve 41 has on its inner surface three axially extending grooves 54. The three grooves 54 are equally spaced around the inner surface of the valve sleeve 41. Each of the grooves 54 communicates with a respective radially extending passage 55. The passages 55 are circumferentially spaced from passage 50.

The passages 55 communicate with an annulus 56 in the housing 11. The annulus 56 communicates with a housing passage 58, which in turn communicates with the chamber portion on a side of the piston furthest from the valve core 40. The valve sleeve 41 further includes three axially extending grooves 60 on its inner surface. The grooves 60 are equally spaced around the inner surface of the valve sleeve 41. The grooves 60 face radially inward toward the valve core 40. Each of the grooves 60 communicates with a respective passage 61 which extends through the valve sleeve 41 and communicates with the chamber portion on a side of the piston closest to the valve core 40.

The valve core 40 has an elongated cylindrical configuration and a plurality of axially extending grooves in its outer circumference. Three grooves 70 are spaced 120° apart about the outer circumference of the valve core 40 and communicate with the passages 50 in the valve sleeve 41. The grooves 70 face radially outward toward the valve sleeve 41 and cooperate with grooves 54 and 60 in the valve sleeve to control a flow of power steering fluid. The extent of the grooves 70 around the outer circumference of the valve core part 40 is such that each of the grooves 70 communicates equally with respective grooves 54 and 60 when the core 40 is in a centered or a neutral position relative to the valve sleeve 41.

Also equally spaced about the outer circumference of the valve core 40 and located intermediate the grooves 70 are axially extending grooves 72. The grooves 72 face radially outward toward the valve sleeve 41 and cooperate with grooves 54 and 60 in the valve sleeve to control a flow of power steering fluid. Each of the grooves 72 communicates with a respective passage (not shown) which extends from each groove 72 into an internal passage 75 of the valve core 40. The internal passage 75 of the valve core 40 also communicates with four radially directed passages 78 extending through the valve core. The radially directed passages 78 communicate with an annulus 80 in the housing 11. The annulus 80 in turn communicates with the return port R in the housing 11.

The power steering assembly 10 has the same general construction and mode of operation as a power steering assembly disclosed in the aforementioned U.S. Pat. No. 4,942,803 issued Jul. 24, 1990 and entitled "Steering Gear With Pressure-Balanced Valve".

Figure 2:
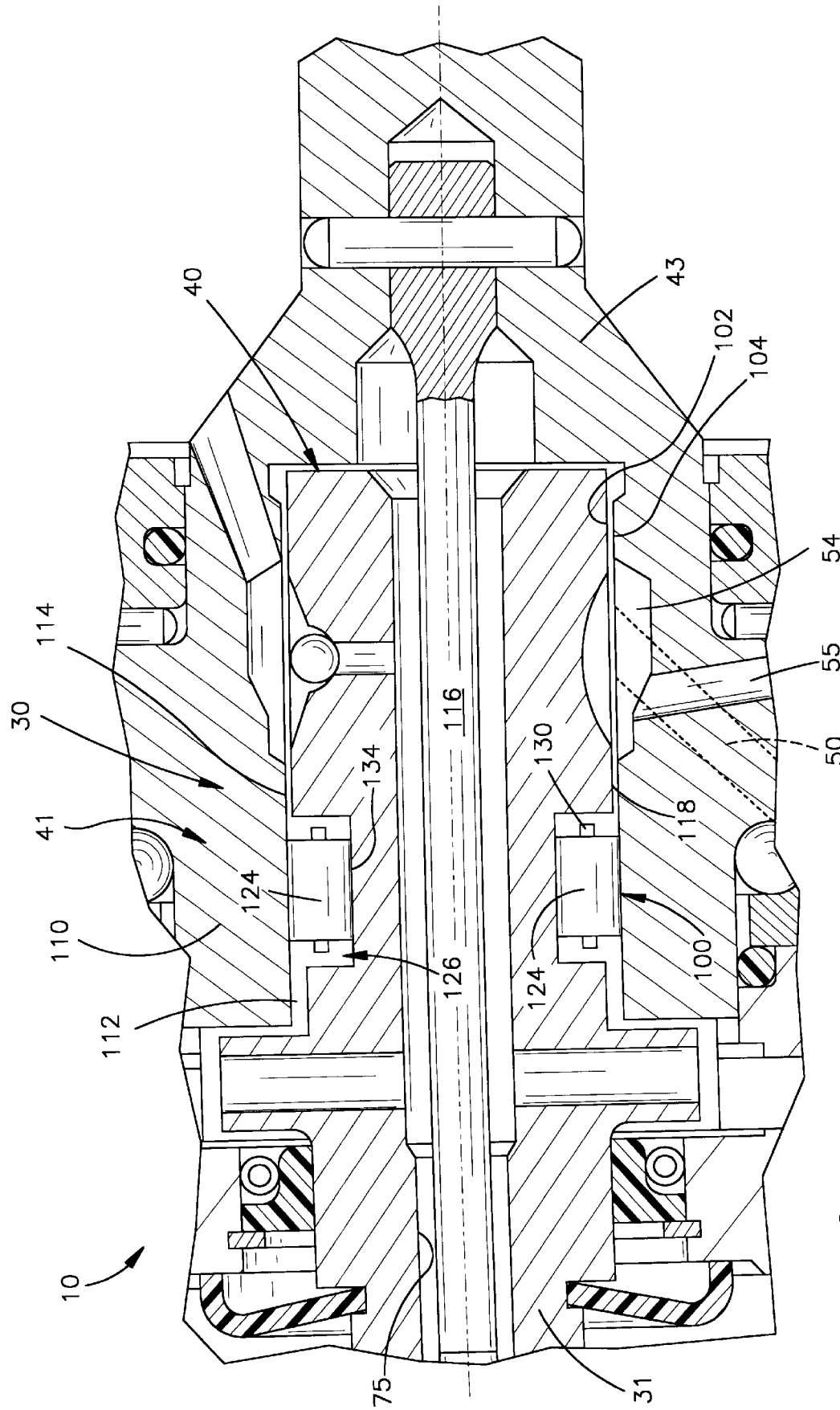
FIG. 2 is an enlarged view of a portion of FIG. 1 further illustrating the construction of the control valve.

The valve sleeve 41 has a side wall portion 110 (FIG. 2). A cylindrical recess 112 is located within the side wall portion 110 and is defined by a cylindrical side surface 114 of the side wall portion 110. The cylindrical side surface 114 is coaxial with the externally threaded follow-up member 43.

The valve core 40 (FIG. 2) is disposed in the recess 112 in the valve sleeve 41. The valve core 40 has a cylindrical outer side surface 118 which is disposed in a generally coaxial relationship with the cylindrical side surface 114 of the recess 112. It should be understood that a clearance space between the cylindrical side surface 114 of the valve sleeve 41 and the cylindrical outer side surface 118 of the valve core 40 has been exaggerated in FIGS. 1 and 2 for purposes of clarity of illustration.

In accordance with a feature of the present invention, a bearing assembly 100 (FIG. 2) is provided between the valve core 40 and valve sleeve 41 at an axially outer end portion of the valve core. In addition, a bearing surface 102 is provided on an axially inner end portion of the valve core 40. The cylindrical bearing surface 102 on the valve core 40 is engageable with a cylindrical bearing surface 104 formed on the valve sleeve 41.

The bearing assembly 100 includes an annular array of roller bearings 124 (FIG. 2) which are disposed in an annular groove 126 which extends into and around the valve core 40. The groove 126 has an inner surface 134. The roller bearing elements 124 are cylindrical and each is rotatable about its axis. The roller bearing elements 124 are interconnected by a roller cage 130. The roller cage 130 is split radially to enable the cage to be expanded and the rollers 124 moved axially along the valve core 40 into alignment with the groove 126. The roller cage is then released and its natural resilience, due to being made of a spring steel or the like, pulls the rollers 124 into the groove 126.

When the power steering assembly 10 is mounted in a vehicle, the force transmitting assembly which interconnects the input shaft 31 and the steering wheel of the vehicle may apply a sidewise load to the input shaft 31. Thus, for example, the input shaft 31 may be loaded in a downward (as viewed in FIG. 2) direction which is perpendicular to the central axis of the valve core 40. This sidewise loading results from a number of factors, including the weight of the steering wheel and the weight of the force transmitting components, such as shafts and joints, which interconnect the shaft 31 and the steering wheel of the vehicle.

A downward sidewise load applied to the shaft 31 will tend to press the left (as viewed in FIG. 2) end of the shaft 31 downward. This will result in the cylindrical inner side surface 134 of the groove 126 being pressed against the lower (as viewed in FIG. 2) rollers 124 of the bearing assembly 100.

If the sidewise load is high enough, the downward force at one end of the input shaft 31 could cause the opposite end (valve core 40) to tend to move upward. As a result, the upper (as viewed in FIG. 2) portion of the cylindrical bearing surface 102 on the axially inner end portion of the valve core 40 would move into engagement with the upper portion of the cylindrical bearing surface 104 on the valve sleeve 41.

Upon rotation of the steering wheel, the shaft 31 will be rotated relative to the valve sleeve 41. When this occurs, any sidewise loading of the valve core 40 will not cause significant resistance to rotation of the valve core relative to the valve sleeve 41. This is due to the relatively low rolling friction resistance provided by the rollers 124 of the bearing assembly 100 and the relatively low frictional resistance provided by engagement of the bearing surface 102 on the valve core 40 with the bearing surface 104 on the valve sleeve 41.

The description above discusses a downward sidewise load on the input shaft 31. It should be understood that the bearing assembly 100 and the bearing surfaces 102 and 104 will function on sidewise loads applied to the input shaft 31 in any direction.

In the embodiment of the invention illustrated in FIGS. 1 and 2, the bearing surface 102 on the axially inner end portion of the valve core 40 is integrally formed as one piece with the valve core and the shaft 31. This results in metal-to-metal contact between the bearing surface 102 on the metal valve core 40 and the bearing surface 104 on the metal valve sleeve 41.

If relatively large sidewise loads are applied to the shaft 31 and valve core 40, the metal-to-metal contact between the bearing surfaces 102 and 104 may result in higher than desired friction forces. In the embodiment of the invention illustrated in FIG. 3, a body 200 of bearing material having a relatively low coefficient of friction is provided on the axially inner end portion of the valve core 40. Since the embodiment of the invention illustrated in FIG. 3 is generally similar to the embodiment of the invention illustrated in FIGS. 1 and 2, similar numerals will be utilized to designate similar components. The suffix letter "a" will be associated with the numerals of FIG. 3 to avoid confusion.

As shown in FIG. 3, a power steering assembly 10a includes a directional control valve assembly 30a having a valve core 40*a* encircled by a valve sleeve 41*a*. A metal shaft 31*a* is integrally formed as one piece with the valve core 40*a*. A bearing assembly 100*a* is disposed between the valve core 40*a* and the valve sleeve 41*a*. The bearing assembly 100*a* includes an annular array of rollers 124*a* which engage a cylindrical inner side surface 114*a* of a cylindrical recess 112*a* disposed in the valve sleeve 41*a*. The rollers 124*a* are disposed in an annular groove 126*a* formed in the valve core 40*a*.

The body 200 of bearing material is disposed on the axially inner end portion of the valve core 40*a* and has a relatively low coefficient of friction. The body 200 of bearing material has an annular configuration and has a cylindrical outer side surface 202 which is disposed adjacent to a cylindrical bearing surface 104*a* of the recess 112*a* in the valve sleeve 41*a*. The body 200 of bearing material is fixedly secured to the valve core 40*a*.

It is contemplated that the body 200 of bearing material can be formed of many different known materials having low coefficients of friction. However, it is preferred to form the body 200 of bearing material of metallic glass. The metallic glass is a metal alloy having an amorphous atomic structure similar to that of silica glass. This amorphous structure of metallic glass may be achieved by cooling of a molten alloy so rapidly that no crystalline structure is formed. The metallic glass has a very low coefficient of friction and a relatively long operating life.

Upon the application of a sidewise load to the shaft 31, the roller bearings 124*a* are pressed against the inner side surface 114*a* of the recess 112*a* and against a cylindrical bottom surface 134*a* of the groove 126*a* in the valve core 40*a*. Assuming that the sidewise load is applied to the valve core 40*a* in a downward direction (as viewed in FIG. 3), the valve core 40*a* tends to pivot in a counterclockwise direction about the bearing assembly 100*a*. This results in the upper portion of the annular body 200 of bearing material moving into abutting engagement with the upper (as viewed in FIG. 3) portion of the bearing surface 104*a* on the side wall of the recess 112*a*. Since the body 200 of bearing material has a very low coefficient of friction, there is negligible resistance to rotation of the valve core 40*a* upon initiation of rotation of a steering wheel.

The body 200 of bearing material may be placed on the valve core 40*a* by a simple procedure. The valve core 40*a* may be preground to form a circumferential recess at the location where the body 200 of bearing material is to be located. The bearing material in molten form is placed in the recess in a casting step. The bearing material when hardened is ground to a final desired diameter by a grinding tool in a final grind step. As a result, the thickness of bearing material applied in the coating step does not have to be a precise thickness.

From the above description of the invention, those skilled in the art will perceive improvements, changes and modifications. Such improvements, changes and modifications within the skill of the art are intended to be covered by the appended claims.

Having described the invention, the following is claimed:

1. A power steering assembly for use in turning steerable vehicle wheels, said power steering assembly comprising:
    a valve core having oppositely disposed first and second end portions;
    a valve sleeve encircling said valve core, said valve core and said valve sleeve having surfaces which cooperate to direct flow of power steering fluid during relative rotation between said valve core and said valve sleeve; and
    a bearing assembly disposed between said valve core and said valve sleeve at a location adjacent to said first end portion of said valve core, said bearing assembly includes an annular plurality of bearing elements which engage said valve sleeve and said valve core and are rotatable relative to said valve sleeve and said valve core, said annular plurality of bearing elements transmitting sidewise loads between said valve sleeve and said valve core;
    said second end portion of said valve core having a bearing surface, said bearing surface being slidable along an inner surface area on said valve sleeve to transmit a sidewise load during relative rotation between said valve core and said valve sleeve.

2. A power steering assembly as set forth in claim 1 wherein said bearing elements support said valve sleeve and said valve core for relative rotation and apply no force to center said valve sleeve and said valve core relative to each other.

3. A power steering assembly as set forth in claim 1 wherein said valve core is formed of metal, said bearing surface being a metal surface which forms a portion of said valve core.

4. A power steering assembly as set forth in claim 1 wherein said valve core is formed of metal, said bearing surface being disposed on a body of material which is fixedly connected with said valve core and which has a lower coefficient of friction than the metal of which said valve core is formed.

5. A power steering assembly as set forth in claim 1 further including a rotatable input member which is integrally formed as one piece with said valve core and extends axially outward from said valve sleeve.

6. A power steering assembly as set forth in claim 1 wherein said valve core is formed of metal, said bearing surface being a surface of an annular body of metallic glass which is fixedly secured to said valve core.

7. A power steering assembly as set forth in claim 1 wherein said valve core has an annular groove extending circumferentially the entire circumference of said valve core, said bearing elements comprising cylindrical rollers located in said groove.

* * * * *